AGITATE

Inventor:
Alfred E. Geils
By: Robert L. Zieg Atty.

SPIN CYCLE

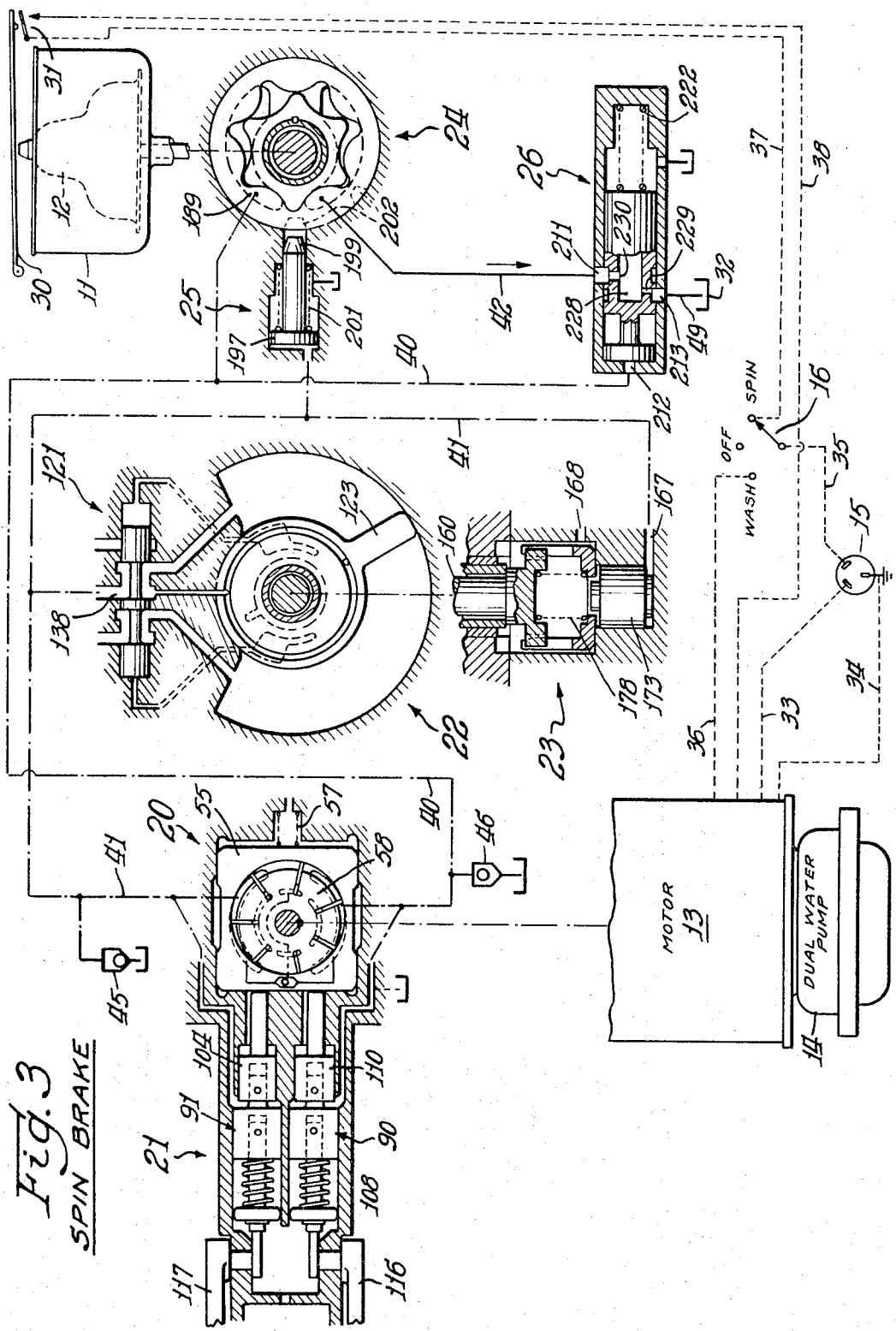

Jan. 30, 1968 — A. E. GEILS — 3,366,205
HYDRAULIC TRANSMISSION WITH LOCK MECHANISM
Filed Dec. 13, 1965 — 5 Sheets-Sheet 4
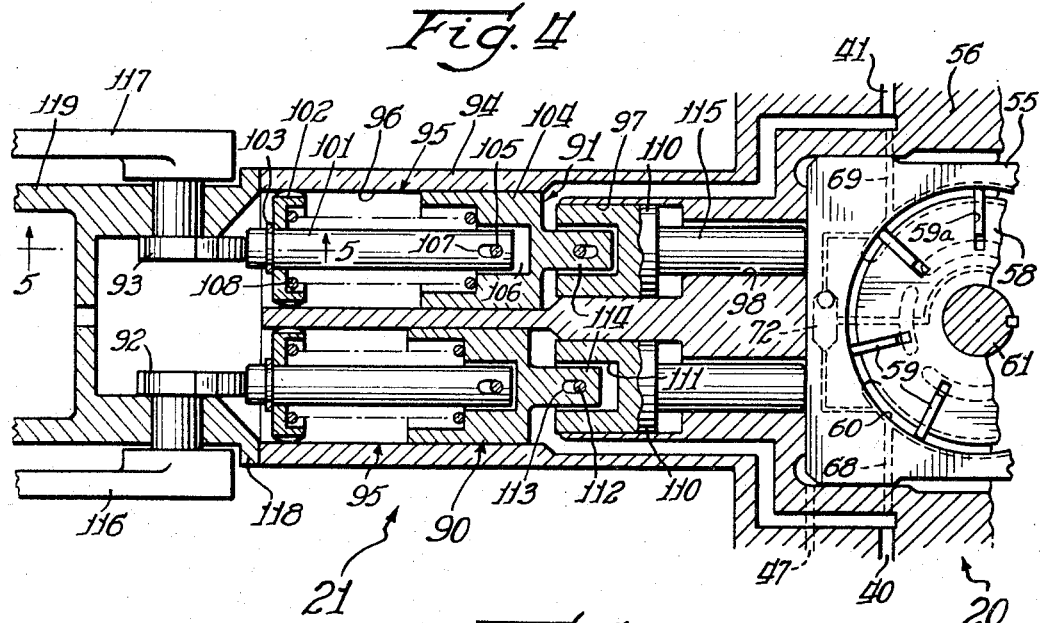
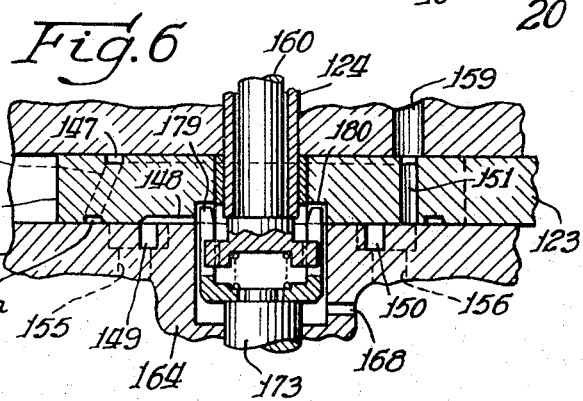
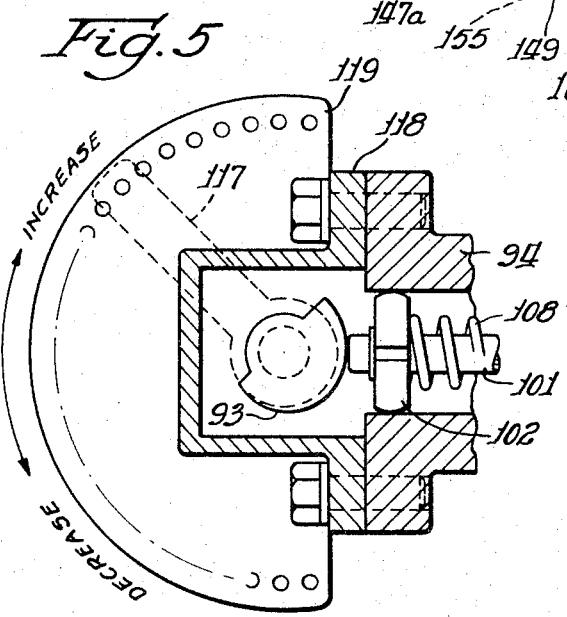

Jan. 30, 1968     A. E. GEILS     3,366,205
HYDRAULIC TRANSMISSION WITH LOCK MECHANISM
Filed Dec. 13, 1965     5 Sheets-Sheet 5
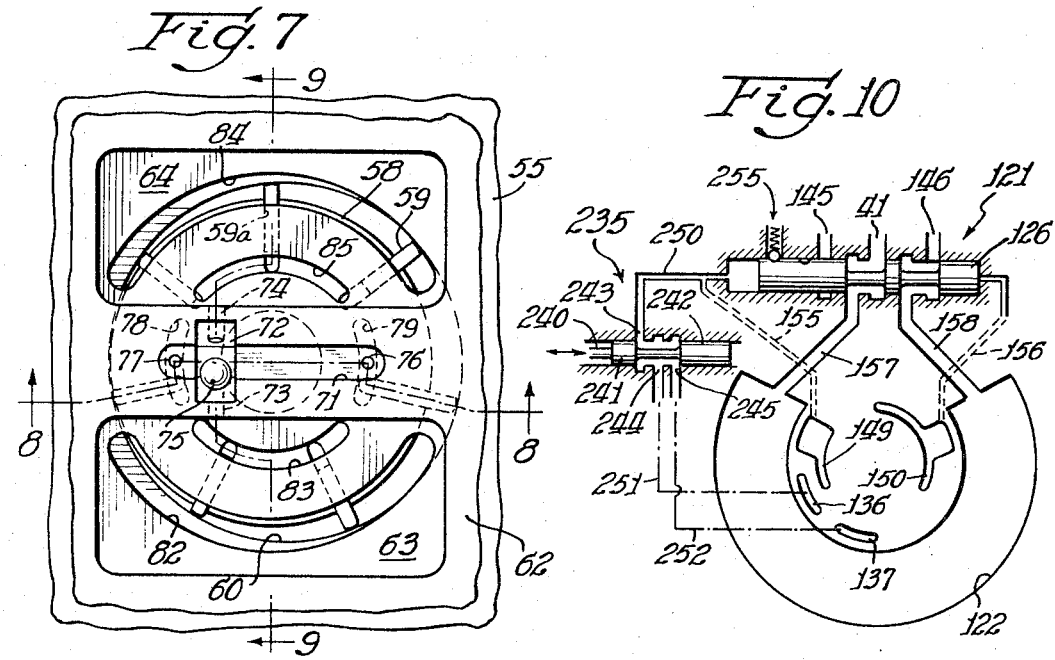
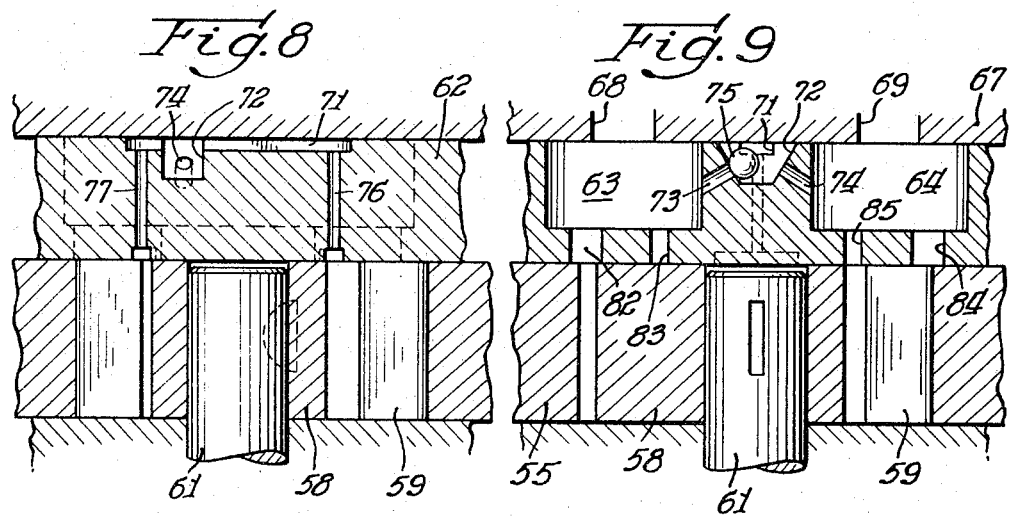

United States Patent Office 3,366,205
Patented Jan. 30, 1968

3,366,205
HYDRAULIC TRANSMISSION WITH LOCK
MECHANISM
Alfred E. Geils, Prospect Heights, Ill., assignor to Borg-Warner Corporation, Chicago, Ill., a corporation of Illinois
Filed Dec. 13, 1965, Ser. No. 513,416
4 Claims. (Cl. 192—3)

ABSTRACT OF THE DISCLOSURE

A lock mechanism for use with clothes washers equipped with hydraulic transmissions wherein an internal and external element fluid motor is used to spin the clothes basket the lock mechanism being operable to hold the outer element stationary and thereby hold the clothes basket stationary for the agitate cycle of the clothes washer.

This invention relates to a hydraulic transmission. More particularly, this invention relates to a lock mechanism adapted for use with a hydraulic transmission for an automatic clothes washer although use in other machines would be contemplated.

It is an object of this invention to provide an improved transmission for the clothes basket and agitator drive of an automatic clothes washer comprising a variable volume fluid pump operable in two directions of rotation. The improved hydraulic transmission includes an improved lock mechanism operable to automatically hold the clothes basket of the washer from following movement of the agitator when the pump is operated in a direction to operate the agitator whereby a washing action may be imparted to the clothes as the agitator oscillates.

It is further an object of this invention to provide an improved hydraulic transmission for an automatic washing machine including a lock mechanism wherein a two element rotary hydraulic motor is utilized to spin the clothes basket and whereby the lock mechanism is effective to hold one element of the motor and thus hold the clothes basket against rotation.

The invention consists of the novel constructions, arrangements and devices to be hereinafter described and claimed for carrying out the above stated objects and such other objects as will appear from the following description of the preferred embodiment of the invention illustrated with reference to the accompanying drawings wherein:

FIGURE 3 is a schematic view showing the hydraulic transmission during the spin brake cycle;

FIGURE 4 is a cross section view of the control system and variable volume pump for the transmission;

FIGURE 5 is a sectional view taken along the line 5—5 of FIGURE 4 showing the cam operation for the control mechanism;

FIGURE 6 is a sectional view taken along the line 6—6 of FIGURE 1;

FIGURE 7 is a top view partially in section of the variable volume pump;

FIGURE 8 is a cross sectional view taken along the line 8—8 of FIGURE 7;

FIGURE 9 is a cross sectional view taken along the line 9—9 of FIGURE 7; and

FIGURE 10 illustrates a modified form of the agitate motor shown in FIGURE 1.

The copending application, SN. 538,434 entitled "Hydraulic Transmission" and of common assignee, includes a complete description and claims to the hydraulic transmission in general in which the mechanism of the present description would be utilized. The mechanism described and claimed herein relates only to the improved lock mechanism used to hold the clothes basket when the transmission is used in an automatic clothes washer.

Figure 1:
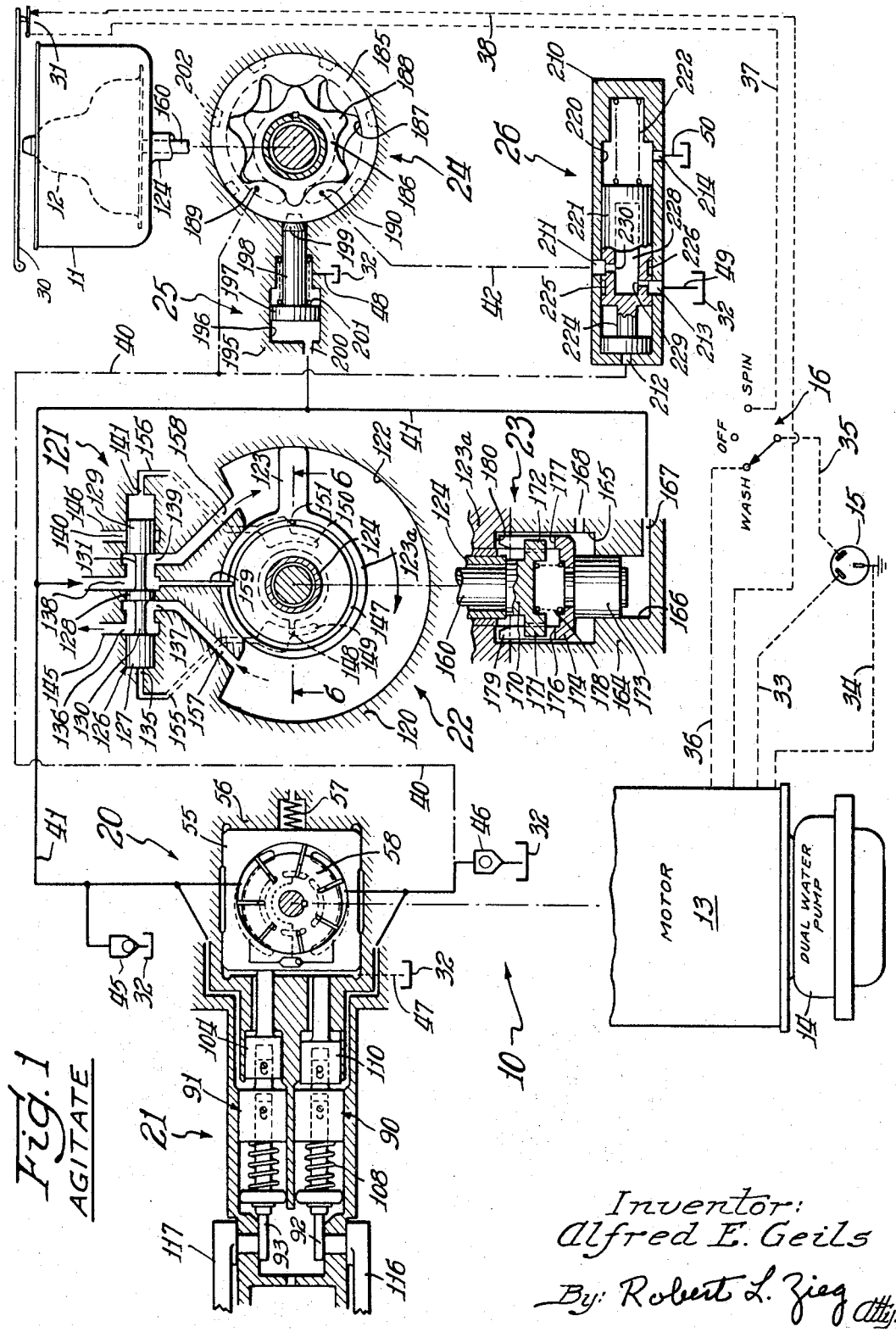
FIGURE 1 is a schematic view of a hydraulic transmission for a clothes washer during the agitate cycle embodying the principles of the invention.

Referring to FIGURE 1, a hydraulic transmission 10 is illustrated for driving the clothes basket 11 or the agitator 12 of an automatic clothes washer. A motor 13 is provided having a water pump driven thereby for recirculating water in the clothes basket of the automatic washer and a source of power 15 is illustrated for operating the motor 13. A cycle selector switch 16 is schematically illustrated in a simplified form although in a washer installation this function would be performed by a timer switch mechanism of known construction.

The important elements of the hydraulic transmission are as follows: a variable volume reversible fluid pump 20; a control mechanism 21 for the pump 20; an agitator drive motor 22; a clutch mechanism 23 for engaging the agitator drive; a spin motor 24; a lock mechanism 25 for the clothes basket 11, and a spin brake valve 26.

A lid 30 is illustrated for the clothes basket of the washer including a safety switch mechanism 31 which is operable to interrupt the power supply to the motor 13 when the lid 30 is raised.

A fluid sump 32 is provided which is schematically illustrated for convenience at various places in the schematic illustration of the invention although in the actual construction one fluid sump 32 is provided into which all the exhaust connections for various elements of the transmission exhaust fluid pressure. Electric wires 33 and 34 interconnect the source of power 15 with motor 13, the line 34 being a ground line. Wire 35 connects the source of power 15 to switch mechanism 16. Switch mechanism 16 is connected to the motor by a wire 36. A wire 37 connects safety switch 31 to the switch mechanism 16. A wire 38 connects safety switch 31 to the motor 13.

A fluid conduit 40 is provided which is connected to the variable volume pump 20, the control mechanism 21, spin motor 24 and the spin brake valve 26. A fluid conduit 41 is provided which is connected to the variable volume pump 20, the control mechanism 21, agitator drive motor 22, lock mechanism 25 and the clutch mechanism 23. A fluid conduit 42 connects spin motor 24 with spin brake valve 26.

Conduit 41 is connected to the fluid sump 32 through a check valve 45 which allows fluid flow only in the direction from the sump into conduit 41. Conduit 40 is connected to the fluid sump 32 through a check valve 46 which allows fluid flow only in a direction from the sump 32 into conduit 40. The variable volume pump 20 is also connected to the fluid sump 32 by a conduit 47. The lock mechanism 25 is connected to the fluid sump 32 by conduit 48 and the spin brake valve 26 is connected to the fluid sump 32 by conduits 49 and 50.

Referring to FIGURES 4, 7, 8 and 9 the variable volume pump 20 is more particularly illustrated. The showing in FIGURE 1 schematically represents the fluid passages within the pump while in FIGURES 7, 8 and 9 is the actual structure of the pump illustrated. The pump 20 has a cam ring 55 which is slidably disposed in a pump body 56. A spring urges the slidable cam ring 55 to the left as illustrated in FIGURE 1 and the control mechanism 21 will urge the slidable cam ring 55 to the right, the spring urging the cam ring to a position of minimum pump displacement.

The pump further includes a rotor 58 having a plurality of vanes 59 slidably disposed in slots 59a in the rotor.

The outer ends of vanes 59 engage an internal surface 60 of the cam ring 55. The rotor is connected to be driven by a shaft 61 which is driven by the electric motor 13 of the transmission.

Disposed immediately above the motor and cam ring of the pump is a port plate 62 which has large rectangular-shaped cavities 63 and 64 therein. Above port plate 62, as illustrated in FIGURE 9, a body member 67 is disposed which has fluid passages formed therein. A passage 68 is connected to cavity 63. A passage 69 is connected to cavity 64. Passage 69 is connected as illustrated in FIGURE 4 to the fluid conduit 41 and the passage 68 is connected to the fluid conduit 40.

In the area of the port plate 62 between cavities 63 and 64 an elongated recess 71 is formed which extends parallel to cavities 63 and 64. A recess 72 intersecting the recess 71 is formed transverse or at right angles to the recess 71. The recess 72 is connected to the cavity 63 by a passage 73 and to the cavity 64 by passage 74. A ball 75 is disposed within the recess 72 and is engageable to block either of the passages 73 74. Vertical passages 76 and 77 are connected to the recess 71. Passages 76 and 77 terminate in elongated arcuate ports 78 and 79.

Formed in the bottom of cavity 63 is a large arcuat port 82 and a small arcuate port 83. Formed in the bottom of the cavity 64 is a large arcuate port 84 and small arcuate port 85.

The large arcuate ports, 82 and 84, are the ports through which fluid is drawn into and forced out of the pump 20. One being a pressure port or output port and the other being an intake port depending upon the direction of rotation of the pump rotor. Arcuate ports 78, 79, 83 and 85 communicate pressure to the back of the vanes 59 to hold them radially outward in contact with the cam surface 60 when the pump is operating to ensure that the force on the vanes is balanced and that they will remain in engagement with the cam surface. The recesses 72 and 71 in cooperation with ball 75 are constructed so that only the pressure side of the pump or the side from which fluid pressure is being supplied to the system and the slots under ports 78 and 79 have high pressure fluid imposed on the vanes for balancing, while on the low pressure side of the pump only inlet pressure will be imposed on the vanes for balancing.

The variable volume pump 20 described above is operative to pump fluid in either direction of rotation and thereby supply fluid pressure either to the conduit 40 or conduit 41. Movement of the slidable cam ring 55 to the right against the force of spring 57 will increase the displacement of the variable volume pump by increasing the eccentricity of the rotor with respect to the cam ring.

Referring to FIGURES 1, 7, 8 and 9, as the pump is rotated in the counterclockwise direction by the electric motor as viewed in FIGURE 7, the cavity 64 will become the pressure outlet recess for the pump supplying fluid pressure to passage 69 and thereby to fluid conduit 41 When the pump rotates counterclockwise as viewed in FIGURE 7, the area of the pump just under the port 84 the volume of the spaces between the vanes 59 is decreasing as the rotor turns thereby squeezing fluid through port 84 into cavity 64 and out passage 69. In the area of the pump under cavity 63 the volume of the space between the vanes 59 is increasing as the rotor rotates thereby creating a vacuum and drawing fluid into pump through passage 68, conduit 40, check valve 46 from the sump 32. As stated above, operation of the control mechanism 21 will change the displacement of the pump moving slidable cam ring 55 against the force of spring 57.

An improved pressure balancing system is utilized with the present pump to hold the vanes against the cam ring surface 60 during rotation of the rotor. The ports 78, 79, 83 and 85 are the pressure balancing ports. Assuming the pump is rotating in the counterclockwise direction fluid from cavity 64 will flow through passage 74 into the recess 72 and recess 71. The ball 75 is thereby forced to the left as viewed in FIGURE 9 blocking passage 73 and trapping high pressure fluid in recess 71.

The high pressure fluid in recess 71 will then flow through vertical passages 76 and 77 into arcuate ports 78 and 79 whereby it will be imposed on the inner end of the vanes 59 in the area of the arcuate ports 78 and 79. High pressure in cavity 64 will also flow through port 85 to the inner side of the vanes 59 in the area of the cavity 64. Thus the vanes on the high pressure side of the pump having high pressure imposed on the inner end thereof to hold them out against the cam surface 60 and to pressure balance the vanes 59 due to the equalizing pressure imposed on the inner end thereof.

It will be apparent that when the pump is operated in the clockwise direction the ball 75 will block passage 74 and the area of the pump under cavity 63 will be pressurized and fluid pressure will again be conducted from recess 71 and the passages 76 and 77 to pressure balance vanes as they move between the area of the cavities 63 and 64. Therefore in the clockwise direction of the pump due to the action of the ball 75 and the fluid passages connected thereto the pressure side of the pump will again have balanced vanes and the vanes will be forced into engagement with the cam surface 60. In this manner springs or other devices to hold the vanes in engagement with the cam surface 60 are unnecessary.

Referring to FIGURES 1 and 4, the control mechanism 21 for pump 20 includes a pair of control elements 90 and 91. The control element 90 is adjustable by a cam 92 and the control element 91 is adjustable by a cam 93. An extension 94 of pump body 56 is provided which includes a pair of stepped bores 95 to contain the control elements 90 and 91. The bores 95 have a first section 96, a second section 97 of a smaller diameter, and a third section 98 of smaller diameter than section 97.

The control elements 91 and 90 each include a pin 101 having a guide 102 mounted thereon which is prevented from sliding off the pin by a snap ring 103. The guides 102 are engaged in the bores 96.

Also slidable within the bore 96 is a piston member 104. A bore 106 is provided in piston 104 having a crosspin 105 mounted therein. The crosspin 105 is engaged within a slot 107 in the pin 101 whereby the piston 104 and pin 101 are connected by a lost motion connection comprising a slot 107 and pin 105. A spring 108 is mounted in engagement with piston member 104 and guide 102.

Mounted within the bore 97 is a piston member 110 having a bore 111 therein. Mounted within the bore 111 is a crosspin 112. Crosspin 112 is engaged with a slot 113 formed in an extension 114 of piston member 104. Thus piston member 110 and the piston member 104 are interconnected through a lost motion connection comprising pin 112 and slot 113. The piston member 110 has a rod extension 115 connected thereto slidable in bore 98. The numbers on the drawing in FIGURE 4 for purposes of clarity have been placed only on the control element 91 although the identical numbers would be provided on the control element 90 for the same parts since the control elements 90 and 91 are identical in structure.

Manual adjusting means or levers 116 and 117 are provided to rotate cams 92 and 93 respectively. Manual levers 116 and 117 are journalled in an end plate 118 secured to the extension 94 in a known manner as for example by bolts.

As illustrated in FIGURE 5 a semicircular portion 119 may be included on the end plate 122 having indicia thereon indicating the speed of operation which has been selected by manual lever 116 or 117 and operation of cams 92 or 93.

The operation of the control elements 90 and 91 may be described by describing the operation of one since they are identical in operation although only one is effective in each cycle of operation. If the variable volume pump 20 is rotated in the clockwise direction fluid pressure will be supplied to conduit 40 as previously described and thus fluid pressure will be admitted through passage 40 into the area between piston members 104 and 110 of the control element 90. Fluid pressure will thus act on the piston members to spread them apart due to the lost motion connections putting them in the position illustrated in FIGURE 4 for control element 90 wherein the pin 112 engages the right end of slot 113. The pin 105 engages the right end of slot 107 due to the action of spring 108.

Depending on the setting of cam 92 the effective length of control element 90 will be established. Fluid pressure imposed on piston members 104 and 110 moves the extension 115 of the valve piston member 110 to the right against the spring 57 a certain extent thereby moving cam ring 55 to a predetermined displacement setting of the pump 20. Since movement of the cam ring 55 of pump 20 to the right increases the displacement of the pump as the cams are moved to an increased position as indicated in FIGURE 5 the speed of operation of the particular fluid motor being operated in the transmission will increase.

If the pump for any reason develops a fluid pressure exceeding that predetermined in accordance with the design of cam 92, the spring rate of springs 108, and the designed effective differential area between piston members 104 and 110, the piston member 104 may move to the left against the force of spring 108 moving pin 105 toward the left side of slot 107 and thus allowing the spring 57 to move the cam ring 55 and extension 115 to the left as the pressure increases to decrease pump displacement and thereby controlling the flow of fluid from the pump until it reaches the predetermined maximum value.

When the pump is operating in the clockwise direction as previously described fluid conduit 40 is pressurized activating spin motor 24, therefore the control element 90 is designed as a control valve for the spin cycle to establish a certain predetermined fluid and flow to be supplied by the pump during the spin cycle dependent upon the speed selected by manual lever 116 and cam 92.

When the pump is operating in the counterclockwise direction as previously described, fluid pressure will be supplied to conduit 41 to activate agitate motor 22 to oscillate agitator 12. Thus the control element 91 is effective during the agitate cycle to control the speed of agitation and allow a certain predetermined fluid flow to be developed during the agitation cycle being dependent upon the setting of manual means 117 and cam 93.

Since generally a greater torque and thereby higher fluid pressures are required to operate the agitator than to operate the clothes basket during the spin cycle, the spring 108 of the control element 91 and the differential area therein are designed to allow greater maximum flow than the spring 108 and differential area of the control element 90.

The improved control mechanism 21 thus includes two control elements which are combination pressure regulators and pump displacement control elements which will allow a predetermined flow and pressure combination development and are further adjustable in a novel manner for providing the proper flow for the cycle selected. Thus a control element has been provided for each of the spin and agitate cycles of a wash machine so that proper pressure and flow combination can be utilized in each cycle.

Referring to FIGURES 1 and 6 the agitate motor 22 is illustrated. The agitate motor includes a body 120 having a control valve 121 and a chamber 122 therein. Within the chamber 122 is mounted a vane 123 which will reciprocate as fluid pressure is admitted to opposite ends of the chamber 122. The vane 123 has an integral hub section 123a and is journaled for rotation around and about a vertical axis extending along the center of a hollow shaft 124 which is drivingly connected to the clothes basket 11.

The control valve 121 includes a spool 126 having lands 127, 128 and 129. The lands 127 and 128 are separated by a groove 130 and the lands 128 and 129 are separated by a groove 131. The area of the body 120 around valve 121 includes ports 135, 136, 137, 138, 139, 140 and 141. Fluid conduits 145 and 146 are connected to posts 136, 140 respectively. Conduits 145 and 146 and exhaust conduits connected to the sump 32. Fluid conduit 41 is connected to the control valve 121 through port 138.

The valve hub section 123a has a circular groove 147 on the top thereof and has a recess 148 in the bottom thereof which is radially extending from the center portion of the vane hub section 123a. On the lower side of hub section 123a is a circular groove 147a connected by a passage 147b to groove 147. Groove 147 is a pressure balancing groove designed to equalize the forces on hub section 123a developed by fluid pressure existing in groove 147.

Located immediately beneath the fluid chamber 122 are partially arcuate fluid ports 149 and 150. A fluid passage 151 extends vertically from the grooves 147 to the under side of hub section 123a so as to be at times in fluid connection with ports 149 or 150.

A fluid passage 155 connects port 135 of control valve 121 to the port 149 of the agitate motor 22. Similarly a conduit 156 connects port 141 of the control valve 121 to the port 150 of the agitate motor 22. A fluid passage 157 connects port 137 of control valve 121 to the left side of fluid chamber 122 as viewed in FIGURE 1. Similarly a fluid passage 158 connects port 139 to control valve 121 to the right side of fluid chamber 122 as viewed in FIGURE 1. The fluid passage 159 connects port 138 of control valve 121 to the circular groove 147 of vane 123.

A clutch mechanism 23 has been provided to drivingly connect the vane 123 to the shaft 160 which is in turn drivingly connected to the agitator 12. The clutch 23 includes an extension 164 of body member 120. The extension 164 is secured to the body member 120 in any known manner and includes a bore 165 and a bore 166 therein. The bore 166 is connected to a fluid passage 41 through a port 167. A bore 165 is connected to the sump through an exhaust port 168. Shaft 160 has a driver 170 secured thereto having driving lugs 171 and 172 thereon.

A piston 173 is slidably mounted in the bore 166 and is in engagement with a dog clutch member 174. The clutch member 174 is slotted as indicated at 176 and 177. The lugs 171 and 172 on driver 170 are engaged in the slots 176 and 177. A spring 178 is mounted in engagement with the clutch member 174 and driver 170 urging the clutch member 174 and thereby piston 173 downwardly as illustrated in FIGURE 1. Clutch member 174 has teeth 179 thereon drivingly engageable with mating recesses 180 provided in hub section 123a of vane 123. Recesses 180 will have driving engagement with the clutch member 174 when fluid pressure is admitted from conduit 41 into bore 166 at which time piston 173 moves up against the force of spring 178 and will place clutch member 174 in engagement with recesses 180 in vane hub section 123a thereby providing a driving engagement between the agitator motor vane 123 and the shaft 160 connected to drive agitator 12 during the agitation cycle. The clutch is disengaged during the spin cycle so the agitator can free wheel and follow movement of the clothes basket.

The operation of the agitator motor is as follows: when the pump 20 is operated in a direction to deliver fluid pressure to conduit 41 fluid pressure will be admitted through port 167 of clutch 23 to actuate clutch 23 as above discussed and drivingly engage vane 123 with the shaft 160 to drive agitator 12. Fluid pressure is also admitted through port 138, groove 131, port 139, and fluid passage 158 to the right hand side of fluid chamber 122 when valve 121 is in first axial position as illustrated in FIGURE 1. Fluid pressure acting on vane 123 will thus move vane 123 in the direction of the arrow or clockwise. The vane 123 will continue the clockwise movement until it reaches a terminal position when the vertical passage 151 passes over the port 149 which will allow fluid pressure to flow through port 149, fluid conduit 155, to port 135 of the control valve 121. Similarly, port 135 is connected to the sump 32 by way of fluid conduit 156, port 150 and rotors 148.

Fluid pressure in port 135 will act on land 127 of the control valve to move spool 126 to the right as seen in FIGURE 1. When the spool 126 is moved to the right to a second axial position the passage 158 and the fluid chamber 122 on the right side of the agitate motor 22 will be connected to port 139, groove 131, port 140, and conduit 146 to the sump 32. Thus fluid pressure will be drained from the right side of fluid chamber 122 with the spool 126 in the right hand position.

Fluid pressure in port 138 now flows through passage 157 to the left hand side of fluid chamber 122 thus acting on the vane 123 to move it in the counterclockwise direction in which direction it will continue until reaching its terminal position when passage 151 passes over port 150, and recess 148 is over port 149. When the vane 123 has moved in its clockwise position over port 149 to actuate control valve 121 and reverse the direction of movement of the vane 123, the recess 148 on the lower side of vane 123 will connect the port 150, passage 156, and port 141 and the right hand side of control valve 121 to the sump 32 through clutch mechanism 23 and port 168 thereby draining fluid pressure from the right hand side of spool 126 so that spool 126 may move to the right. Thus the vane 123 will continue to oscillate between its extreme position determined by the length of the arcuate ports 149 and 150 and the location of the vertical passage 151.

In FIGURE 10 a modified form of agitate motor 22 is shown wherein a variable stroke of the agitator is available. As illustrated in FIGURE 10 the agitate motor 22 is provided with an additional manual control valve 235 and the body portion 122 is provided with additional arcuate ports 136 and 137. Manual valve 235 has a valve spool 240 having lands 241 and 242 thereon. The manual valve 235 also includes ports 243, 244 and 245. The port 243 is connected to the fluid conduit 155 by a fluid conduit 250, port 244 of manual valve 235 is connected to the additional arcuate port 136 by conduit 251, and the port 245 of manual valve 235 is connected to the additional arcuate port 137 by fluid conduit 252.

The control valve 121 may also be provided with a ball detent mechanism 255 to provide accurate positioning of the control valve 121 in its two axial positions.

The agitate motor is illustrated in FIGURE 10 and is operative to provide a variable stroke of the agitator of the washing machine as reflected by the stroke of the vane 123 of the agitate motor due to the use of additional arcuate ports 136 and 137.

The manual valve 235 may be so positioned that fluid pressure in conduit 250 cannot flow into either of conduits 251 and 252. In such case port 149 is active to provide the reversing feature of the agitate motor and the agitate motor will operate as described above with a terminal position of vane 123 above port 149.

The manual valve 235 spool 240 may also be moved to a position, interconnecting fluid conduits 250 and 251. In such case the agitator when moving clockwise, will move to a position from that illustrated in FIGURE 1 to a terminal position in which the fluid passage 151 moves over arcuate port 136 at which time fluid pressure will be conducted to fluid passage 151, port 136, fluid conduit 251 and fluid conduit 250 to actuate spool 126 of control valve 121 to move the spool to the right and thereby admit fluid pressure to fluid passage 157 to thus reverse the vane 123 and move it in the counterclockwise direction. The terminal position of the vane 123 is thus above arcuate port 136.

The manual valve 235 may also be moved to a position interconnecting fluid conduit 250 and fluid conduit 252, in such case when the vane 123 moves clockwise from the position illustrated in FIGURE 1, the vane will move until it is in position over arcuate port 137 at which time the fluid pressure in fluid passage 151 will be conducted to port 137, conduit 252, valve 235, conduit 250 to actuate control valve 121. The terminal position of vane 123 is thus above port 137.

The extent of the arcuate port 150 is increased in this modification to provide for fluid pressure exhaust through the recess 148 as described above when either of the additional arcuate ports 136 or 137 are made functional by manual valve 235.

The improved structure in FIGURE 10 provides a means of having a variable stroke for the agitator of a washer machine or for the vane of any fluid vane type motor by having two arcuate ports which may be selectively actuated by the use of the manual valve. As used in a washing machine the stroke of the agitator may thus be varied to accommodate different types of loads which may be washed within the wash machine.

The spin motor 24 of the hydraulic transmission includes an outer rotor 185 and an inner rotor 186. The outer rotor has recess 187 therein adapted to receive the teeth 188 on inner rotor 186. Fluid pressure is admitted during the spin cycle through conduit 40 as indicated at 189 and in a known manner will act in the fluid chambers between the teeth 188 of the inner rotor and the recesses 187 of the outer rotor to spin the outer and inner rotors as fluid pressure is received. Conduit 42 is the exhaust fluid connection for the spin motor which is connected to the spin motor 24 in a known manner as indicated at 190.

The inner rotor 188 is drivingly connected to the hollow shaft 124 which is part of the clothes basket 11 and thus as the inner rotor 186 rotates the clothes basket will be rotated at a speed dependent upon the flow of fluid admitted from fluid conduit 40.

Fluid pressure actuated lock 25 is an improved lock mechanism which is operative during the agitate cycle to hold the clothes basket 11 from rotational movement. As the clothes are agitated by agitator 12 in the agitate cycle there will be a tendency for basket 11 to follow movement of agitator 12 and unless it is held from rotational movement, the agitating or washing action would not be obtained.

The fluid pressure actuated lock 25 includes a body portion 195 having a bore 196 therein. Slidably mounted within bore 196 is a piston 197 having a stem or arm 198 thereon with a tapering end portion 199. A port 200 will admit fluid pressure from conduit 41 into the bore 196. A spring 201 is mounted within the bore 196 and acts on the piston 197 to urge the piston to the left.

During the agitate cycle when it is desired to hold the clothes basket 11 stationary fluid pressure will be supplied from conduit 41 through port 200 into bore 196 thus moving the piston 196 and stem 198 to the right as viewed in FIGURE 1, against the force of spring 201. A series of recesses 202 are provided on the outer periphery of the outer rotor 185. These recesses 202 are of a shape conforming to the shape of end portion 199. Thus as the outer rotor 185 would begin to move following the movement of agitator 12, fluid pressure acting on piston 197 will eventually engage the stem 198 within one of the recesses 202 and thus lock the outer rotor 185 against rotation. Since the outer rotor 185 is in driving engagement with the inner rotor 186 and the inner rotor 186 is drivingly connected to the clothes basket 11. The action of stem 198 holding the outer rotor 185 against rotation will be effective to hold clothes basket 11 against rotation.

Thus at a convenient location remote from the clothes basket 11 a fluid pressure actuated lock has been provided of simple design which will be effective to hold the clothes basket in response to actuation of the agitate fluid pressure circuit.

The spin brake valve 26 includes a valve body 210 having ports 211, 212, 213, and 214 therein. Port 211 communicates with fluid conduit 42; port 212 communicates with fluid conduit 40; port 213 communicates with fluid conduit 49 and port 214 communicates with fluid conduit 50. Conduits 49 and 50 flow to sump 32. Valve body 210 includes a bore 220 having a valve spool 221 slidable therein.

A spring 222 is mounted in the bore 220 in engagement with spool 221 and urges the spool 221 to the left as viewed in FIGURE 1. The spool 221 has a large groove 224 and small grooves 225 and 226 therein. The spool is further provided with a hollow section 228 within the spool. Ports 229 and 230 are provided in the spool. The port 230 interconnects annular groove 226 and hollow portion 228 and the port 229 interconnects annular groove 225 and the hollow portion 228. The port 229 is relatively small and is effective as a restriction or orifice.

Figure 2:
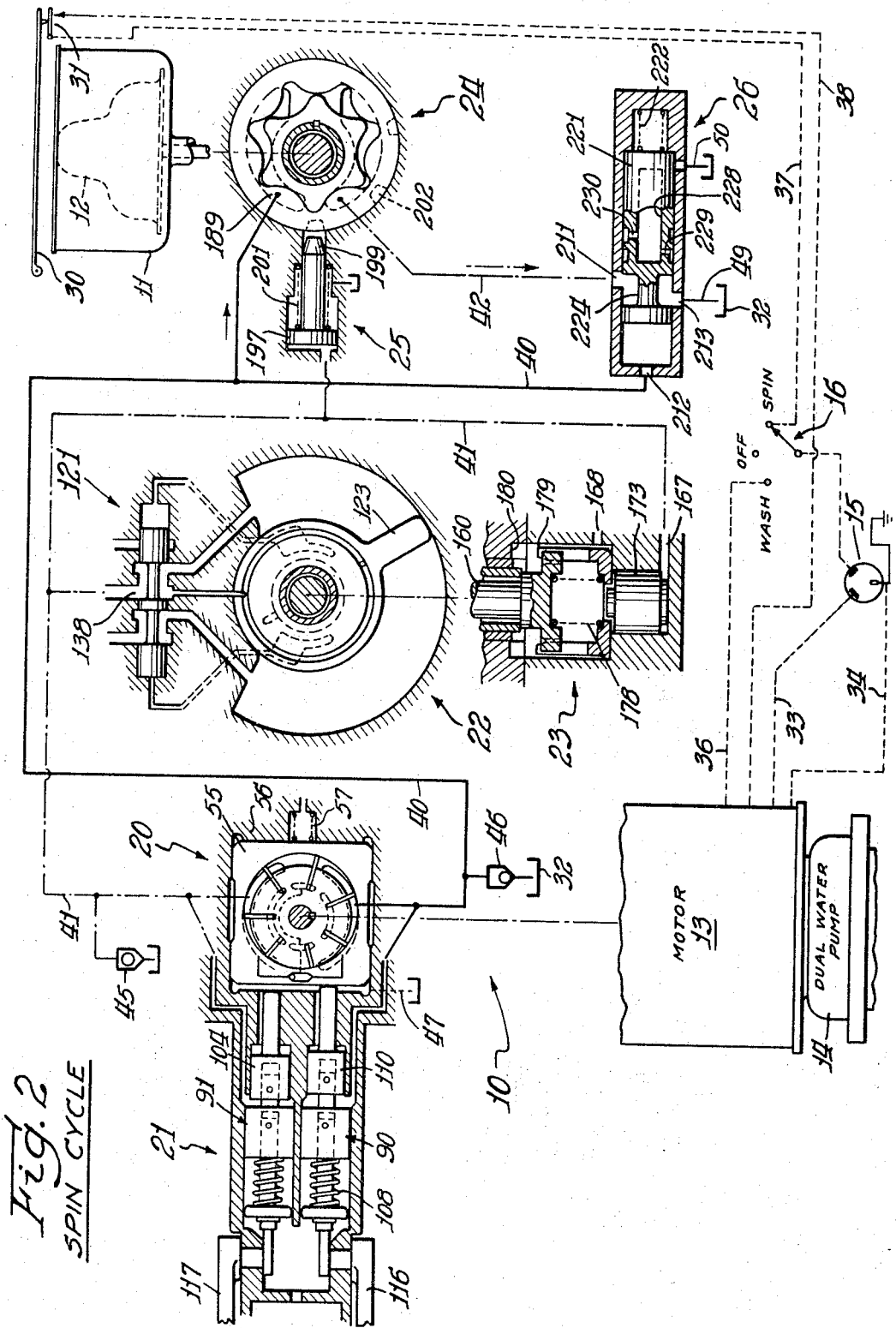
FIGURE 2 is a schematic view showing the hydraulic transmission during the spin cycle operation.

The operation of the spin brake valve 26 is as follows: when the fluid pump 20 is supplying fluid pressure to fluid conduit 40 and thereby spin motor 24 during the spin cycle, fluid pressure will also be admitted through port 212 of the spin brake valve 26 and will act on the spool 221 to move the spool to the right against the force of spring 222 to the position illustrated in FIGURE 2. In this position the large groove 224 is interconnecting ports 211 and 213 of the spin brake valve. Thus exhaust fluid pressure from the spin motor 24 and conduit 42 can flow unrestricted to the sump 32 through the spin brake valve 26 and conduit 49.

When the spin cycle is interrupted by the normal cycle timer switch 16 when the lid 30 is lifted interrupting the switch 31 thereby deenergizing the motor and stopping the pump 20, fluid pressure will no longer be admitted to the spin brake valve through port 212 thus the spring will be effective to move the spool 221 of the spin brake valve to the left to the position illustrated in FIGURES 1 and 3. In the position of the spin brake valve piston in FIGURE 3 ports 211 and 213 of the spin brake valve are again interconnected but fluid now flows from port 211 through port 230 of the spool 221 into the hollow portion 228 and then through restricted passage or port 229 to conduit 49 to the sump. Thus at this time the fluid being exhausted from spin motor 24 is restricted in its flow to the sump.

A pressure build-up will thereby take place in fluid conduit 42, since the clothes basket 11 is still tending to spin it will now drive the inner rotor 186 of the spin motor 24 and spin motor 24 will act as a pump pumping fluid into conduit 42. Since the conduit 42 at this time has a restricted outlet the pressure will build up and serve to stop relative rotation between the pump elements and thus serve as a hydraulic brake for clothes basket 11.

The improved spin brake valve 26 is therefore an advantageous structure which utilizes the spin motor of the transmission as a brake to quickly bring to a stop the clothes basket of a wash machine. Quick stopping of the clothes basket is an important consideration in automatic clothes washers since the clothes basket must be brought to a stop before the agitation cycle can begin and the time taken to stop the clothes basket is directly reflected in the cycle time of the automatic washer. Further, the quick stopping of the clothes basket is a safety feature to prevent injury of a person placing his hand in the basket while it is moving. The spin brake valve 26 is of simple construction and operates automatically in response to the fluid pressure condition in the conduit 40.

The operation of the hydraulic transmission of the present invention in summary is as follows: the timer or selector switch 16 of the automatic washer schematically represented by switch 16 will select either the wash or spin cycle for the hydraulic transmission. The speed of the motor involved in the particular cycle will be controlled by manual adjustment of means 116 or 117 to change the effective length of the respective control valve 90 or 91 and thus the position of cam ring 55 of the pump 20.

If the agitate cycle is selected the pump 20 supplies fluid pressure to conduit 41. The pressure and flow developed by pump 20 and thereby the speed of agitate motor 22 will depend upon adjustment of control valve 91 for the agitate cycle, as illustrated in FIGURE 1, by manual means 117 as previously described. Fluid pressure in conduit 41 will serve to actuate the lock 25 to hold the clothes basket 11 stationary in the manner described above. It will also actuate the clutch 23 as described above to drivingly interconnect the agitator and the agitate motor 22. Fluid pressure admitted to the agitate motor from conduit 31 and port 138 will serve to actuate the vane 123 of the agitate motor so that it oscillates from one terminal position to the other to oscillate the agitator 12 of the wash machine in a manner previously described. At this time the spin brake valve 26 will be in a position as illustrated in FIGURE 1.

When the timer or selector switch 16 then selects the spin cycle the pump will stop operating in the direction supplying pressure to conduit 41 and will begin to rotate in the direction to supply fluid pressure to conduit 40. The flow developed by the pump 20 will now be controlled by manual adjustment of the control valve 90 controlling the position of the cam ring 55 of the pump. Thus a speed can be selected for the spin of the clothes basket 11 at this time by adjustment of the pump displacement by manual means 116.

Fluid pressure in conduit 40 will now be delivered at 189 to the spin motor 24 to actuate the spin motor and the spin motor will thereby drive the clothes basket 11 to spin dry the clothes. The lock mechanism 25 is at this time released since no fluid pressure exists in conduit 41 and spring 201 wil move the piston 197 to the left disengaging the end portion 199 from one of the recesses 202 in the outer element of the spin motor 24. Fluid pressure in conduit 40 as above described will move the spin brake valve 26 to a position as illustrated in FIGURE 2 allowing free flow of exhaust fluid pressure to the sump from the spin motor 24.

At this time since no fluid pressure exists in conduit 41 the spring 178 will serve to disengage the clutch 23 which had previously provided a driving connection between the agitator motor vane 123 and the agitator 12.

As will be apparent from the above description applicants have provided an improved hydraulic transmission which may be utilized for example in an automatic clothes washer comprising a compact and efficient structure. The improved hydraulic transmission includes an improved lock structure which automatically will be actuated when the wash machine is in the agitate cycle to hold the clothes basket against rotation. Further the improved lock structure is located at a point remote from the clothes basket whereby it can conveniently be connected to the transmission hydraulic circuit.

Various features of the invention have been particularly shown and described; however, it should be obvious to one skilled in the art that various modifications may be made therein without departing from the scope of the invention.

I claim:

1. In a hydraulic transmission for a clothes washer having a clothes basket, a source of fluid pressure, a hydraulic motor comprising inner and outer relatively rotating elements, one of said elements being connected to said clothes basket, means adapted to connect said motor to said source of pressure whereby rotation of said elements will spin said clothes basket, a fluid pressure operated lock engageable with the other rotatable element, said means operable to connect said source of pressure to said lock to actuate said lock whereby engagement of said lock with said other element will hold both said elements and thereby said clothes basket stationary.

2. A transmission as claimed in claim 1 wherein said lock comprises a piston having an arm fixed thereto, said other rotatable element having at least one recess therein, said arm being engageable with said recess to hold said other element against rotation.

3. A transmission as claimed in claim 1 wherein said inner element has external teeth and said outer element has internal teeth meshing with the teeth on said inner element.

4. A transmission as claimed in claim 3 wherein said lock includes a piston having an arm thereon, at least one recess in said outer element engageable by said arm whereby said arm will hold said outer element against rotation when engaged in said recess.

References Cited

UNITED STATES PATENTS

| | | | |
|---|---|---|---|
| 2,831,554 | 4/1958 | Reynolds | 192—3 |
| 3,125,200 | 3/1964 | Kaman | 192—3 |
| 3,131,797 | 5/1964 | Bochan | 192—114 |

ROBERT A. O'LEARY, *Primary Examiner.*

ARTHUR T. McKEON, *Examiner.*